(12) United States Patent
Kwalk et al.

(10) Patent No.: US 7,868,092 B2
(45) Date of Patent: *Jan. 11, 2011

(54) BIMODAL POLYETHYLENE COMPOSITIONS FOR BLOW MOLDING APPLICATIONS

(75) Inventors: Tae Hoon Kwalk, Belle Mead, NJ (US); Stephen Paul Jaker, Woodbridge, NJ (US); Sun-Chueh Kao, Hillsborough, NJ (US); Mark Bradley Davis, Lake Jackson, TX (US); Natarajan Muruganandam, Hillsborough, NJ (US); Jo Ann Marie Canich, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 300 days.

This patent is subject to a terminal disclaimer.

(21) Appl. No.: 12/152,502

(22) Filed: May 15, 2008

(65) Prior Publication Data

US 2008/0312380 A1 Dec. 18, 2008

Related U.S. Application Data

(63) Continuation-in-part of application No. 11/152,536, filed on Jun. 14, 2005, now Pat. No. 7,432,328.

(51) Int. Cl.
*C08L 23/00* (2006.01)
*C08L 23/04* (2006.01)

(52) U.S. Cl. .................... 525/191; 525/240
(58) Field of Classification Search .............. 525/191, 525/240
See application file for complete search history.

(56) References Cited

U.S. PATENT DOCUMENTS

| | | | |
|---|---|---|---|
| 4,461,873 A | 7/1984 | Bailey et al. ............... 525/240 |
| 4,547,551 A | 10/1985 | Bailey et al. ............... 525/240 |
| 4,960,741 A | 10/1990 | Bailly et al. ................ 502/10 |
| 5,260,384 A | 11/1993 | Morimoto et al. ........... 525/240 |
| 5,288,933 A | 2/1994 | Kao et al. .................. 585/513 |
| 5,352,749 A | 10/1994 | DeChellis et al. ........... 526/68 |
| 5,525,678 A | 6/1996 | Mink et al. ................ 525/246 |
| 5,677,375 A | 10/1997 | Rifi et al. .................. 525/53 |
| 5,889,128 A | 3/1999 | Schrock et al. ............. 526/107 |
| 5,908,679 A | 6/1999 | Berthold et al. ............ 428/36.9 |
| 6,201,078 B1 | 3/2001 | Breulet et al. .............. 526/113 |
| 6,242,543 B1 | 6/2001 | Follestad et al. ............ 526/118 |
| 6,271,325 B1 | 8/2001 | McConville et al. ......... 526/107 |
| 6,472,484 B1 | 10/2002 | Abe et al. .................. 526/201 |
| 6,545,093 B1 | 4/2003 | de Lange et al. ............ 525/191 |
| 6,562,905 B1 | 5/2003 | Nummila-Pakarinen et al. ...................... 525/191 |
| 6,579,922 B2 | 6/2003 | Laurent .................... 524/240 |
| 6,605,675 B2 | 8/2003 | Mawson et al. ............. 526/115 |
| 6,608,149 B2 | 8/2003 | Mawson et al. ............. 526/60 |
| 6,642,313 B1 | 11/2003 | Kazakov et al. ............. 525/191 |
| 6,989,344 B2 * | 1/2006 | Cann et al. ................. 502/150 |
| 7,432,328 B2 * | 10/2008 | Jaker ....................... 525/191 |
| 2004/0048736 A1 | 3/2004 | Mink et al. ................. 502/102 |
| 2006/0281867 A1 | 12/2006 | Jaker ....................... 525/240 |
| 2007/0073010 A1 | 3/2007 | Pannell et al. |
| 2010/0133714 A1 * | 6/2010 | Jaker et al. .................. 264/83 |

FOREIGN PATENT DOCUMENTS

| | | |
|---|---|---|
| EP | 0517868 | 11/1995 |
| EP | 0739937 | 5/2001 |
| EP | 1241188 | 9/2002 |
| WO | WO 99/01460 | 1/1999 |
| WO | WO 99/29737 | 6/1999 |
| WO | WO 2005/061225 | 7/2005 |

OTHER PUBLICATIONS

Berthold, J. et al. "*Advanced Polymerisation process for tailor made pipe resins*" Plast., Rubber Compos. Process. Appl., pp. 368-372 (1996).
Böhm, L.L. et al., "*The Industrial Synthesis of Bimodal Polyethylene Grades with Improved Properties*" Studies in Surface Science and Catalysis, Catalyst Design for Tailor-Made Polyolefinsm pp. 351-363 (1994).
Burkhardt, Ulrich et al., "*Preparation of Polymers with Novel Properties*" Dieter Voigt, Institute for Polymer Research Dresden, pp. 55-78 (1995).
Davey, Chris, R., et al., "*Engineered Catalyst for Controlled Bimodal Structures in UNIPOL Single Reactor Gas Phase Polyethylene*," SPE-Polyolefins 2002 International Conference Feb. 25-27, (2002).
Ebner, K., "*Bi-Modal HDPE for Piping Systems and Further Applications*" Adv. Plast. Technol. APT '97, Int. Conf., pp. 1-8 (1997).
Scheirs, John, et al., "*PE100 Resins for Pipe Applications: Continuing the Development into the 21st Century*" TRIP vol. 4, No. 12, 408-415 (1996).
Yano, et al. "*Homo- and copolymerization of ethylene by cationic hafnocene catalysts based on tetrakis (pentafluorophenyl) borate*" Macromol. Chem. Phys. 200, No. 4, 924-932 (1999).
Zabusky, H.H., et al. "*Properties of High Density Polyethylene with Bimodal Molecular Weight Distribution*" SPE Transactions, pp. 17-21 (1964).

* cited by examiner

*Primary Examiner*—Nathan M Nutter

(57) ABSTRACT

A bimodal polyethylene composition that includes ethylene-derived units, and, optionally, one or more other olefin-derived units, wherein the bimodal polyethylene composition possesses a density of at least 0.940 g/cc, an average molecular weight (Mw) of from 200,000 to 370,000, a z-average molecular weight (Mz) of from 1,500,000 to 3,400,000 Daltons, and a z+1 average molecular weight (Mz+1) of from 2,500,000 to 6,800,000 Daltons, is provided in various embodiments. Articles made therefrom and methods of making the same are also provided.

30 Claims, No Drawings

BIMODAL POLYETHYLENE COMPOSITIONS FOR BLOW MOLDING APPLICATIONS

CROSS REFERENCE TO RELATED APPLICATIONS

This application in a continuation-in-part of Ser. No. 11/152,536, filed Jun. 14, 2005, the disclosure of which is incorporated by reference in its entirety.

FIELD OF INVENTION

The present invention relates generally to polyethylene compositions. More specifically, but without limitation, the present invention relates to high density bimodal polyethylene compositions suitable for blow molding applications and methods of producing the same.

BACKGROUND

Advances in polymerization and catalysis have produced new polymers having improved physical and mechanical properties useful in a wide variety of products and applications. High density bimodal polyethylene compositions, and in particular, high density "bimodal" or "multimodal" polyethylenes ("bHDPE"), are known to be useful in making a variety of commercial products such as films, pipes, and some blow molding applications. Despite their common use in commercial products, high density polyethylene (HDPE) blow molding compositions and their corresponding industrial applications still desire improvements in environmental stress crack resistance (ESCR), which is a measure of the resistance to mechanical failure. Consequently, higher density polyethylene compositions have not typically been used for particular blow molding applications, such as in manufacturing bottles, where a high resistance to cracking, i.e., high ESCR, is desired or required. However, higher density compositions are preferred to obtain the desired mechanical properties such as bottle rigidity.

Thus, there is a need for developing high density polyethylene compositions that exhibit improved blow molding performance properties including enhanced ESCR and/or increased top-load strength for stacking over currently available HDPE.

SUMMARY

In a class of embodiments, the invention provides for a bimodal polyethylene composition which includes ethylene-derived units, and optionally, other olefin-derived units, wherein the bimodal polyethylene composition has a density of at least 0.940 g/cc, an average molecular weight (Mw) of from 200,000 to 370,000, a z-average molecular weight (Mz) of from 1,500,000 to 3,400,000 Daltons, and a z+1 average molecular weight (Mz+1) of from 2,500,000 to 6,800,000 Daltons.

In another class of embodiments, the invention provides for a method of producing a bimodal polyethylene composition in which the method includes contacting ethylene and, optionally, one or more other olefins, with a catalyst, the catalyst selected from the group consisting of conventional-type transition metal catalysts, metallocene catalysts, chromium catalysts, Group 15 atom and metal containing catalysts, and a combination thereof.

Furthermore, the bimodal polyethylene composition may possess a density of at least 0.940 g/cc, an average molecular weight (Mw) of from 200,000 to 370,000, a z-average molecular weight (Mz) of from 1,500,000 to 3,400,000 Daltons, and a z+1 average molecular weight (Mz+1) of from 2,500,000 to 6,800,000 Daltons.

In yet another class of embodiments, the invention provides for a blow molded article which includes a bimodal polyethylene composition including ethylene-derived units, and, optionally, one or more other olefin-derived unit, wherein the bimodal polyethylene composition possesses a density of at least 0.940 g/cc, an average molecular weight (Mw) of from 200,000 to 370,000, a z-average molecular weight (Mz) of from 1,500,000 to 3,400,000 Daltons, and a z+1 average molecular weight (Mz+1) of from 2,500,000 to 6,800,000 Daltons.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced therewith permission from IUPAC), unless reference is made to the Previous IUPAC form noted with Roman numerals (also appearing in the same), or unless otherwise noted.

Bimodal high density polyethylene (HDPE) compositions having enhanced Environmental Stress Crack Resistance (ESCR) and/or top-load strength are provided in various embodiments. The bimodal polyethylene compositions may include at least one high molecular weight polyethylene component (HMWC) and at least one low molecular weight polyethylene component (LMWC). Without being bound to theory, it is believed that the broader molecular weight distribution (MWD) and comonomer response of the HMWC provides a bimodal polyethylene composition capable of producing a bimodal blow molding product with enhanced ESCR and/or top-load strength.

The term "polyethylene" may refer to a polymer or polymeric composition made of at least 50% ethylene-derived units, in one possible embodiment, at least 70% ethylene-derived units, in a class of embodiments, at least 80% ethylene-derived units, 90% ethylene-derived units, 95% ethylene-derived units, or even 100% ethylene-derived units. The polyethylene can thus be a homopolymer or a copolymer, including a terpolymer, having other monomeric units. A polyethylene polymer described herein may, for example, include at least one or more other olefin(s) and/or comonomers. Illustrative comonomers may include alpha-olefins including, but not limited to, propylene, 1-butene, 1-pentene, 1-hexene, 1-octene, 1 decene and 4-methyl-1-pentene. Another class of embodiments may include ethacrylate or methacrylate.

The term "bimodal," when used herein to describe a polymer or polymer composition, e.g., polyethylene, may refer to a "bimodal molecular weight distribution." By way of example, a single composition that includes polyolefins with at least one identifiable high molecular weight distribution and polyolefins with at least one identifiable low molecular weight distribution is considered to be a "bimodal" polyolefin, as that term is used herein. Preferably, other than having different molecular weights, the high molecular weight polyolefin and the low molecular weight polyolefin are both polyethylenes but may have different levels of comonomer distribution. A material with more than two different molecular weight distributions (sometimes referred to as a "multimodal" polymer) will be considered "bimodal" as that term is used herein.

As disclosed herein bimodal polyethylene compositions may comprise a "high molecular weight polyethylene component" ("HMWC") and a "low molecular weight polyethylene component" ("LMWC"). HMWC may refer to the polyethylene component in the bimodal composition that has a higher molecular weight than the molecular weight of at least one other polyethylene component in the same composition. When the composition includes more than two components, e.g., a trimodal composition, then the high molecular weight component is to be defined as the component with the highest weight average molecular weight. The term "low molecular weight polyethylene component" ("LMWC") refers to the polyethylene component in the composition that has a lower molecular weight than the molecular weight of at least one other polyethylene component in the same composition. When the composition includes more than two components, e.g., a trimodal composition, then the low molecular weight component is to be defined as the component with the lowest weight average molecular weight.

In a class of embodiments, a high molecular weight component may constitute a component forming a part of the bimodal composition that has a weight average molecular weight (Mw) of about 200,000 or more. In another class of embodiments, the weight average molecular weight of the high molecular weight polyethylene component may range from a low of about 200,000, 220,000, 240,000 or 260,000 to a high of 300,000, 320,000, 350,000 or 375,000.

The number average (Mn), weight average (Mw), z-average (Mz), and Z+1 average (Mz+1) molecular weight are terms that refer to the molecular weight values for the entire composition (e.g., the blended composition), as opposed to that of any individual component, unless specifically noted otherwise. The number average, weight average, z-average, and z+1 average molecular weight values encompass any value as determined by any published method. For example, the weight average molecular weight (Mw) can be measured or calculated according to the procedure described in ASTM D 3536-91 (1991) and ASTM D 5296-92 (1992).

The number average, weight average, z-average and z+1 average molecular weight of a particular polyethylene component (e.g., the high molecular weight polyethylene component and the low molecular weight polyethylene component), can be determined by any published method. A preferred method uses any published deconvolution procedure, e.g., any published technique for elucidating each individual polymer component's molecular information in a bimodal polymer. A particularly preferred technique uses a Flory deconvolution, including but not limited to, the Flory procedures set forth in U.S. Pat. No. 6,534,604. Any program that incorporates the principles contained in the following reference may be useful: P. J. Flory, Principles of Polymer Chemistry, Cornell University Press, New York 1953. Any computer program capable of fitting an experimental molecular weight distribution with multiple Flory or log-normal statistical distributions may also be useful. The Flory distribution can be expressed as follows:

$$Y = A_o (M/Mn)^2 e^{(-M/Mn)}$$

In this equation, Y is the weight fraction of polymer corresponding to the molecular species M, Mn is the number average molecular weight of the distribution, and $A_o$ is the weight fraction of the site generating the distribution. Y can be shown to be proportional to the differential molecular weight distribution (DMWD) which is the change in concentration with the change in log-molecular weight. The SEC chromatogram represents the DMWD. Any computer program that minimizes the square of the difference between the experimental and calculated distributions by varying the $A_o$ and Mn for each Flory distribution is preferred. Particularly preferred is any program that can handle up to 8 Flory distributions. A commercially available program, called Excel Solver, offered by Frontline Systems, Inc. at www.solver.com can be used to perform the minimization. Using this program, special constraints can be placed on the individual Flory distributions that allow one to fit chromatograms of experimental blends and bimodal distributions.

Bimodal distributions may fit within two individual groups of four constrained Flory distributions, for a total of eight distributions. One constrained group of four fits the low molecular weight component while the other group fits the high molecular weight component. Each constrained group is characterized by $A_o$ and Mn of the lowest molecular weight component in the group and the ratios $A_o(n)/A_o(1)$ and $Mn(n)/Mn(1)$ for each of the other three distributions (n=2, 3, 4). Although the total number of degrees of freedom is the same for the constrained fit as for eight unconstrained Flory distributions, the presence of the constraint is needed to more accurately determine the contribution to the total chromatogram of the individual low molecular weight and high molecular weight components in a bimodal polymer. Once the fitting process is complete, the program will then calculate the molecular weight statistics and weight percents of the individual high and low molecular weight components.

The term "MWD" (molecular weight distribution) may have a similar meaning as "PDI" (polydispersity index), which is characterized herein using Size-Exclusion Chromatography (SEC). The terms MWD or PDI are intended to have the broadest definition that persons in the pertinent art have given that term as reflected in one or more printed publications or issued patents. The MWD (PDI) is the ratio of weight-average molecular weight (Mw) to number-average molecular weight (Mn), i.e., Mw/Mn.

Not wishing to be bound by theory, it is believed that the comonomer response of the HMWC provides a z-average molecular weight (Mz) and z+1 average molecular weight (Mz+1) that provides the surprising balance between mechanical strength, top-load strength and ESCR. In a class of embodiments, the bimodal polyethylene composition disclosed herein may have a z-average molecular weight (Mz) of about 1,500,000 Daltons or more. In another class of embodiments, the bimodal polyethylene composition disclosed herein may have a z-average molecular weight (Mz) of about 2,000,000 Daltons or more. In yet another illustrative class of embodiments, the bimodal polyethylene composition disclosed herein may have a z-average molecular weight (Mz) of about 3,000,000 Daltons or more. In illustrative embodiments, the bimodal polyethylene composition may have a z-average molecular weight (Mz) between about 1,500,000 Daltons and 2,000,000 Daltons. In other illustrative embodiments, the bimodal polyethylene composition may have a z-average molecular weight (Mz) between 1,900,000 Daltons and 3,400,000 Daltons.

In a class of embodiments, the bimodal polyethylene composition disclosed herein may have a z+1-average molecular weight (Mz+1) of about 2,500,000 Daltons or more. In another class of embodiments, the bimodal polyethylene composition disclosed herein may have a z+1-average molecular weight (Mz+1) of about 4,000,000 Daltons or more. In yet another illustrative class of embodiments, the bimodal polyethylene composition disclosed herein may have a z+1-average molecular weight (Mz+1) of about 5,000,000 Daltons or more. In illustrative embodiments, the bimodal polyethylene composition may have a z+1-average molecular weight (Mz+1) between about 3,000,000 Daltons and 4,500,000 Daltons or between 4,000,000 Daltons and 6,800,000 Daltons.

In a class of embodiments, the bimodal polyethylene composition disclosed herein may have a z-average molecular weight (Mz) to average molecule weight (Mw) ratio (Mz/Mw) of at least about 6.0 or more. In illustrative embodiments, the bimodal polyethylene composition may have Mz/Mw values from a low of about 6.6, 6.8 or 7.0 to a high of about 8.8, 9.0 or 9.2. In other illustrative embodiments, the bimodal polyethylene composition may have Mz/Mw values of between about 6.6 to about 9.2, about between 6.9 to about 8.8 or about 7.3 to about 9.2.

Density is a physical property of a composition and may be determined in accordance with ASTM D 792. Density can be expressed as grams per cubic centimeter (g/cc) or unless otherwise noted. In a class of embodiments, the bimodal polyethylene composition disclosed herein may have a density of from 0.9560 g/cc or above, alternatively 0.9570 g/cc or above, alternatively 0.9580 g/cc or above, and alternatively still 0.9600 g/cc or above. An illustrative range of density for the bimodal polyethylene composition is from 0.9560 g/cc to 0.9607 g/cc.

The term "MFR ($I_{21}/I_2$)" as used herein means the ratio of $I_{21}$ (also referred to as flow index or "FI") to $I_2$ (also referred to as melt index or "MI") where $I_{21}$ is measured by ASTM-D-1238-F (at 190° C., 21.6 kg weight) and MI ($I_2$) is measured by ASTM-D-1238-E (at 190° C., 2.16 kg weight).

In a class of embodiments, the bimodal polyethylene composition has an MFR of about 100 and more. In another class of embodiments, the bimodal polyethylene composition may have an MFR ranging from a low of about 120, 140 or 160 to a high of about 260, 270 or 280. In yet another class of embodiments, the bimodal polyethylene composition may have an MFR from about 128 to about 275.

In a class of embodiments, the bimodal polyethylene composition has an FI of at least 20 g/10 min and less than 45 g/10 min. In another class of embodiments, the bimodal polyethylene composition may have an FI ranging from a low of about 26 g/10 min or 30 g/10 min to a high of about 40 g/10 min or 45 g/10 min.

In a class of embodiments, the bimodal polyethylene composition has an MI of at least 0.1 g/10 min. In another class of embodiments, the bimodal polyethylene composition may have an MI ranging from a low of about 0.10 g/10 min or 0.20 g/10 min to a high of about 0.25 g/10 min or 0.30 g/10 min.

Environmental Stress Crack Resistance (ESCR) test was performed in accordance with ASTM D-1693 Procedure B, reported as $F_{50}$ hours. ESCR measures the number of hours that 50% of the tested specimen exhibited stress cracks. The specific specimen dimensions were 38 mm×13 mm with a thickness of 1.90 mm.

In a class of embodiments, the bimodal polyethylene composition has an ESCR of at least 150 hours. In another class of embodiments, the bimodal polyethylene composition may have an ESCR ranging from about 150 to about 700 hours. In further embodiments, the bimodal polyethylene composition may have an ESCR ranging from about 150 to about 500 hours and from about 158 to 249 hours.

Polymerization Process

The polymerization process used to form any of the polymer components can be carried out using any suitable process. Illustrative processes include, but are not limited to, high pressure, solution, slurry and gas phase processes. Various processes are contemplated comprising all or less than all of the steps or components discussed below, any number of repeats of any of the steps discussed, and in any order.

Certain polyethylenes can be made using a gas phase polymerization process, e.g., utilizing a fluidized bed reactor. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

In one embodiment, any of the polyethylene components may be polymerized using a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. The make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

The reactor temperature of the fluid bed process herein preferably ranges from 30° C. to 150° C. In general, the reactor temperature is operated at the highest temperature that is feasible taking into account the sintering temperature of the polymer product within the reactor. Regardless of the process used to make the polyolefins of the invention, the polymerization temperature, or reaction temperature should be below the melting or "sintering" temperature of the polymer to be formed. Thus, the upper temperature limit in one embodiment is the melting temperature of the polyolefin produced in the reactor.

The one or more reactor pressures in a gas phase process (either single stage or two or more stages) may vary from 100 psig (690 kPa) to 500 psig (3448 kPa), and in the range from 200 psig (1379 kPa) to 400 psig (2759 kPa) in another embodiment, and in the range from 250 psig (1724 kPa) to 350 psig (2414 kPa) in yet another embodiment.

The gas phase reactor is capable of producing from 500 lbs of polymer per hour (227 Kg/hr) to 200,000 lbs/hr (90,900 Kg/hr), and greater than 1000 lbs/hr (455 Kg/hr) in another embodiment, and greater than 10,000 lbs/hr (4540 Kg/hr) in yet another embodiment, and greater than 25,000 lbs/hr (11,300 Kg/hr) in yet another embodiment, and greater than 35,000 lbs/hr (15,900 Kg/hr) in yet another embodiment, and greater than 50,000 lbs/hr (22,700 Kg/hr) in yet another embodiment, and from 65,000 lbs/hr (29,000 Kg/hr) to 100,000 lbs/hr (45,500 Kg/hr) in yet another embodiment.

Further, it is common to use a staged reactor employing two or more reactors in series, wherein one reactor may produce, for example, a high molecular weight component and another reactor may produce a low molecular weight component. In one or more embodiments, the polyolefin can be produced using a staged gas phase reactor.

A slurry polymerization process can also be used. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, such as, for example, a branched alkane. The medium employed should be liquid under the conditions of polymerization and relatively inert. When a propane medium is used the process must be operated above the reaction diluent critical temperature and pressure. In one embodiment, a hexane, isopentane or isobutane medium is employed.

Process for Making the Bimodal Composition

Various different types of processes, and reactor configurations, can be used to produce the bimodal polyethylene composition, including melt blending, series reactors (i.e., sequentially-configured reactors) and single reactors using a mixed catalyst system. The bimodal composition, for example, can be a reactor blend (also sometimes referred to as a chemical blend). A reactor blend is a blend that is formed (polymerized) in a single reactor, e.g., using a mixed catalyst system. The bimodal composition can also be a physical blend, e.g., a composition formed by the post-polymerization blending or mixing together of two or more polymer components, i.e., at least one HMWC and at least one LMWC, where each of the polymer components is polymerized using the same or different catalyst systems.

Catalysts

Any catalyst or combination of catalysts utilized to polymerize olefins are suitable for use in the polymerizing processes and compositions of the present invention. The following is a discussion of various catalysts useful in the invention set forth for the purpose of explanation and not limitation.

General Definitions

As used herein, a "catalyst system" may include at least one activator or alternatively, at least one cocatalyst. A catalyst system may also include other components, for example, supports, and is not limited to the catalyst component and/or activator or cocatalyst alone in or combination. The catalyst system may include any suitable number of catalyst components in any combination as described herein, as well as any activator or cocatalyst in any combination as described herein.

As used herein, a "catalyst compound" may include any compound that, when activated, is capable of catalyzing the polymerization or oligomerization of olefins, wherein the catalyst compound comprises at least one Group 3 to 12 atom, and optionally at least one leaving group bound thereto, in several embodiments.

Conventional-Type Transition Metal Catalysts

Conventional-type transition metal catalysts may be traditional Ziegler-Natta catalysts and Phillips-type chromium catalyst well known in the art. Examples of conventional-type transition metal catalysts are disclosed in U.S. Pat. Nos. 4,115,639, 4,077,904 4,482,687, 4,564,605, 4,721,763, 4,879,359 and 4,960,741. The conventional-type transition metal catalyst compounds that may be used in the present invention include, but are not limited to transition metal compounds from Groups III to VIII of the Periodic Table of the Elements. All reference to the Periodic Table of the Elements herein shall refer to the Periodic Table of the Elements, published and copyrighted by the International Union of Pure and Applied Chemistry, Inc., 2004. Also, any reference to a Group or Groups shall be to the Group or Groups as reflected in this Periodic Table of the Elements using the IUPAC system for numbering groups.

These conventional-type transition metal catalysts may be represented by the formula: $MR_x$, where M is a metal from Groups IIIB to VIII, preferably Group IVB, more preferably titanium; R is a halogen or a hydrocarbyloxy group; and x is the valence of the metal M. Non-limiting examples of R may include alkoxy, phenoxy, bromide, chloride and fluoride. Conventional-type transition metal catalysts where M is titanium may include, but are not limited to, $TiCl_4$, $TiBr_4$, $Ti(OC_2H_5)_3Cl$, $Ti(OC_2H_5)Cl_3$, $Ti(OC_4H_9)_3$ Cl, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566. The $MgTiCl_6$ (ethyl acetate)$_4$ derivative is one such example. British Patent Application 2,105,355 describes various conventional-type vanadium catalyst compounds. Non-limiting examples of conventional-type vanadium catalyst compounds include vanadyl trihalide, alkoxy halides and alkoxides such as $VOCl_3$, $VOCl_2$(OBu) where Bu=butyl and $VO(OC_2H_5)_3$; vanadium tetrahalide and vanadium alkoxy halides such as $VCl_4$ and $VCl_3$(OBu); vanadium and vanadyl acetyl acetonates and chloroacetyl acetonates such as $V(AcAc)_3$ and $VOCl_2(AcAc)$ where (AcAc) is an acetyl acetonate. Examples of conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, isobutyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention may include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in, for example, U.S. Pat. Nos. 3,242,099 and 3,231,550.

Still other conventional-type transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A10 420 436. The conventional-type transition metal catalysts of the invention may also have the general formula $M'_1M''X_{2t}Y_uE$, where M' is Mg, Mn and/or Ca; t is a number from 0.5 to 2; M" is a transition metal Ti, V and/or Zr; X is a halogen, preferably Cl, Br or I; Y may be the same or different and is halogen, alone or in combination with oxygen, —$NR_2$, —OR, —SR, —COOR, or —OSOOR, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoamides, (h) esters of phosphoric and phosphorus acid, and (j) phosphorus oxy-chloride. Non-limiting examples of complexes satisfying the above formula include: $MgTiCl_5 \cdot 2CH_3COOC_2H_5$, $Mg_3Ti_2Cl_{12} \cdot 7CH_3COOC_2H_5$, $MgTiCl_5 \cdot 6C_2H_5OH$, $MgTiCl_5 \cdot 100CH_3OH$, $MgTiCl_5 \cdot$ tetrahydrofuran, $MgTi_2Cl_{12} \cdot 7C_6H_5CN$, $MgTi_2Cl_{12} \cdot 6C_6H_5COOC_2H_5$, $MgTiCl_6 \cdot 2CH_3COOC_2H_5$, $MgTiCl_6 \cdot 6C_5H_5N$, $MgTiCl_5(OCH_3)_2CH_3COOC_2H_5$, $MgTiCl_5N(C_6H_5)_2 \cdot 3CH_3COOC_2H_5$, $MgTiBr_2Cl_4 \cdot 2(C_2H_5)O$, $MnTiCl_5 \cdot 4C_2H_5OH$, $Mg_3V_2Cl_{12} \cdot 7CH_3COOC_2H_5$, $MgZrCl_6 \cdot 4$ tetrahydrofuran. Other catalysts may include cationic catalysts such as $AlCl_3$, and other cobalt and iron catalysts well known in the art.

The conventional-type transition metal catalyst compounds disclosed herein may be activated with one or more of the conventional-type cocatalysts described below.

Conventional-Type Cocatalysts

Conventional-type cocatalyst compounds for the above conventional-type transition metal catalyst compounds may be represented by the formula $M^3M^4_vX^2_cR^3_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Examples of conventional-type organometallic cocatalyst compounds of Group IA, IIA and IIIA useful with the conventional-type catalyst compounds described above include, but are not limited to, methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexylaluminum, triethylaluminum, trimethylaluminum, and tri-isobutylaluminum. Other conventional-type cocatalyst compounds may include mono-organohalides and hydrides of Group IIA metals, and mono- or di-organohalides and hydrides of Group IHA metals. Non-limiting examples of such conventional-type cocatalyst compounds may include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415.

For purposes of this patent specification and appended claims, conventional-type transition metal catalyst compounds exclude those metallocene catalyst compounds discussed below. For purposes of this patent specification and the appended claims the term "cocatalyst" refers to conventional-type cocatalysts or conventional-type organometallic cocatalyst compounds.

Metallocene Catalysts

Generally, metallocene catalyst compounds may contain one or more ligands including cyclopentadienyl (Cp) or cyclopentadienyl-type structures or other similar functioning structure such as pentadiene, cyclooctatetraendiyl and imides. It is understood by one of skill in the art that references made herein to metallocene catalyst compounds and/or systems may also refer to metallocene-type catalyst compounds and/or systems. As used herein, a catalyst system is a combination of a catalyst compound and a cocatalyst or activator (described below). Typical metallocene compounds are generally described as containing one or more ligands capable of η-5 bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements. Exemplary of these metallocene catalyst compounds and catalyst systems are described in, for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664. Also, the disclosures of European publications such as EP-A-0 591 756, EP-A-0 520 732, EP-A-0 420 436, EP-B 10 485 822, EP-B 10 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144 describe typical metallocene catalyst compounds and catalyst systems. Furthermore, metallocene catalyst compounds may contain one or more leaving group(s) bonded to the transition metal atom. For the purposes of this patent specification and appended claims the term "leaving group" may refer to one or more chemical moieties, such as a ligand, bound to the center metal atom of a catalyst component that can be abstracted from the catalyst component by an activator or cocatalyst, thus producing a catalyst species active toward olefin polymerization or oligomerization.

The Cp ligands are generally represented by one or more bonding systems comprising π bonds that can be open systems or ring systems or fused system(s) or a combination thereof. These ring(s) or ring system(s) are typically composed of atoms selected from Groups 13 to 16 atoms, preferably the atoms are selected from the group consisting of carbon, nitrogen, oxygen, silicon, sulfur, phosphorous, boron and aluminum or a combination thereof. Alternatively, the ring(s) or ring system(s) may be composed of carbon atoms such as, but not limited to, those cyclopentadienyl ligands or cyclopentadienyl-type ligand structures (structures isolobal to cyclopentadienyl). The metal atom may be selected from Groups 3 through 16 and the lanthanide or actinide series of the Periodic Table of Elements, and selected from Groups 4 through 12 in another embodiment, and selected from Groups 4, 5 and 6 in yet a more particular embodiment, and selected from Group 4 atoms in yet another embodiment.

In one embodiment, metallocene catalyst compounds of the invention are represented by the formula:

$$L^A L^B M Q_n \quad (I)$$

wherein each $L^A$ and $L^B$ are bound to the metal atom (M), and each Q is bound to the metal center, n being 0 or an integer from 1 to 4, alternatively 1 or 2, and in another embodiment 2.

In formula (I), M is a metal from the Periodic Table of the Elements and may be a Group 3 to 12 atom or a metal from the lanthanide or actinide series Group atom in one embodiment; selected from the group consisting of Sc, Ti, Zr, Hf, V, Nb, Ta, Mn, Re, Fe, Ru, Os, Co, Rh, Ir, and Ni in another embodiment; and selected from the group consisting of Groups 4, 5 or 6 transition metal in yet another embodiment. In other illustrative embodiments, M is a transition metal from Group 4 such as Ti, Zr or Hf; selected from the group of Zr and Hf in another embodiment; and Zr in yet a more particular embodiment. The oxidation state of M may range from 0 to +7 in one embodiment; and in another embodiment, is +1, +2, +3, +4 or +5; and in yet another illustrative embodiment is +2, +3 or +4. The groups bound to M are such that the compounds described below in the formulas and structures are electrically neutral, unless otherwise indicated. The Cp ligand(s) form at least one chemical bond with the metal atom M to form a metallocene catalyst compound. The Cp ligands are distinct from the leaving groups bound to the catalyst compound in that they are not highly susceptible to substitution/abstraction reactions.

The $L^A$ and $L^B$ groups of formula (I) are Cp ligands, such as cycloalkadienyl ligands and hetrocylic analogues. The Cp ligands typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Also, $L^A$ and $L^B$ may be any other ligand structure capable of η-5 bonding to M and alternatively, LA and LB may comprise one or more heteroatoms, for example, nitrogen, silicon, boron, germanium, and phosphorous, in combination with carbon atoms to form a cyclic structure, for example, a heterocyclopentadienyl ancillary ligand. Furthermore, each of $L^A$ and $L^B$ may also be other types of ligands including but not limited to amides, phosphides, alkoxides, aryloxides, imides, carbolides, borollides, porphyrins, phthalocyanines, corrins and other polyazomacrocycles. Each $L^A$ and $L^B$ may be the same or different type of ligand that is π-bonded to M. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further illustrative ligands may include cyclopentaphenanthreneyl, benzindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof (as described in more detail below), heterocyclic versions thereof and the like, including hydrogenated versions thereof.

Each $L^A$ and $L^B$ may be unsubstituted or substituted with a combination of substituent R groups. Non-limiting examples of substituent R groups include one or more from the group selected from hydrogen, or linear, branched, alkyl radicals or cyclic alkyl radicals, alkenyl, alkynl or aryl radicals or combination thereof, halogens and the like, including all their isomers, for example tertiary butyl and iso-propyl. In illustrative embodiments, substituent R groups may comprise 1 to 30 carbon atoms or other substituents having up to 50 non-hydrogen atoms that can each be substituted with halogens or heteroatoms or the like. Alkyl or aryl substituent R groups may include, but are not limited to, methyl, ethyl, propyl, butyl, pentyl, hexyl, cyclopentyl, cyclohexyl, benzyl or phenyl groups and the like, including all their isomers, for example, tertiary butyl, isopropyl, and the like. Halogenated hydrocarbyl radicals may include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen or Group 15-containing radicals including dimethylamine, dimethylphosphine, diphenylamine, methylphenylphosphine; and chalcogen or Group 16-containing radicals including methoxy, ethoxy, propoxy, phenoxy, methylsulfide, ethylsulfide and the like. Non-hydrogen substituent R groups may include the atoms carbon, silicon, boron, aluminum, nitrogen, phosphorous, oxygen, tin, germanium and the like including olefins such as but not limited to olefinically unsaturated substituents including vinyl-terminated ligands, for example, but-3-enyl, prop-2-enyl, hex-5-enyl, 2-vinyl, or 1-hexene. Also, at least two R groups, preferably two adjacent R groups may be joined to form a ring structure having from 3 to 30 atoms selected from carbon, nitrogen, oxygen, phosphorous, silicon, germanium, boron or a combination thereof. Also, an R group such as 1-butanyl may form a bond to the metal M.

The leaving groups Q of formula (I) are monoanionic labile ligands bound to M. Depending on the oxidation state of M, the value for n is 0, 1 or 2 such that formula (I) above represents a neutral metallocene catalyst compound, or a positively charged compound. In a class of embodiments, Q may comprise weak bases such as, but not limited to, alkyls, alkoxides, amines, alkylamines, phosphines, alkylphosphines, ethers, carboxylates, dienes, hydrocarbyl radicals having from 1 to 20 carbon atoms, $C_6$ to $C_{12}$ aryls, $C_7$ to $C_{20}$ alkylaryls, $C_7$ to $C_{20}$ arylalkyls, hydrides or halogen atoms (e.g., Cl, Br or I) and the like, and combinations thereof. Other examples of Q radicals include those substituents for R as described above and including cyclohexyl, heptyl, tolyl, trifluoromethyl, tetramethylene and pentamethylene, methylidene, methyoxy, ethyoxy, propoxy, phenoxy, bis(N-methylanilide), dimethylamide, dimethylphosphide radicals and the like.

In addition, metallocene catalyst compounds of the invention include those of formula (I) where $L^A$ and $L^B$ are bridged to each other by a bridging group, A. These bridged compounds are known as bridged, metallocene catalyst compounds represented by the formula (II):

$$L^A(A)L^BMQ_n \qquad (II)$$

wherein each $L^A$ and $L^B$ are bound to the metal center M, and each Q is bound to the metal center, n being 0 or an integer from 1 to 4, alternatively 1 or 2, and in another embodiment 2; the groups $L^A$, $L^B$ M and Q are as defined in formula (I); and the divalent bridging group A is bound to both $L^A$ and $L^B$ through at least one bond or divalent moiety, each.

Non-limiting examples of bridging group A from formula (II) include divalent bridging groups containing at least one Group 13 to 16 atom. In one possible embodiment, bridging group A may be referred to as a divalent moiety such as, but not limited to, carbon, oxygen, nitrogen, silicon, germanium and tin or a combination thereof. In other embodiment, bridging group A contains carbon, silicon or germanium atom and in yet another illustrative embodiment, A contains at least one silicon atom or at least one carbon atom. Other non-limiting examples of bridging groups A may be represented by $R'_2C=$, $R'_2Si=$, $—(R')_2Si(R')_2Si—$, $—(R')_2Si(R')_2C—$, $R'_2Ge=$, $—(R')_2Si(R')_2Ge—$, $—(R')_2Ge(R')_2C—$, $R'N=$, $R'P=$, $—(R')_2C(R')N—$, $—(R')_2C(R')P—$, $—(R')_2Si(R')N—$, $—(R')_2Si(R')P—$, $—(R')_2Ge(R')N—$, $—(R')_2Ge(R')P—$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atom, substituted Group 16 atom, or halogen; or two or more R' groups may be joined to form a ring or ring system; and independently, each Q can be a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof.

It is also contemplated that in one embodiment, the metallocene catalysts of the invention include their structural or optical or enantiomeric isomers (meso and racemic isomers) and mixtures thereof. In another embodiments, the metallocene compounds of the invention may be chiral and/or a bridged metallocene catalyst compound. Further, as used herein, a single, bridged, asymmetrically substituted metallocene catalyst component having a racemic and/or meso isomer does not, itself, constitute at least two different bridged, metallocene catalyst components.

Group 15 Atom and Metal Containing Catalysts

One aspect of the present invention includes the use of "Group 15 atom and metal containing" catalyst components either alone or for use with a metallocene or other olefin polymerization catalyst component. Generally, Group 15 atom and metal containing catalyst components may include complexes of Group 3 to 12 metal atoms, wherein the metal atom is 2 to 8 coordinate, the coordinating moiety or moieties including at least two Group 15 atoms, and up to four Group 15 atoms. In one embodiment, the Group 15 atom and metal containing catalyst component is a complex of a Group 4 metal and from one to four ligands such that the Group 4 metal is at least 2 coordinate, the coordinating moiety or moieties including at least two nitrogens. Representative Group 15 atom and metal containing compounds are disclosed in, for example, WO 99/01460, EP A1 0 893 454, EP A1 0 894 005, U.S. Pat. No. 5,318,935, U.S. Pat. No. 5,889,128, U.S. Pat. No. 6,333,389 B2 and U.S. Pat. No. 6,271,325 B1.

In a class of embodiments, the Group 15 atom and metal containing compounds may include Group 4 imino-phenol complexes, Group 4 bis(amide) complexes, and Group 4 pyridyl-amide complexes that are active towards olefin polymerization to any extent. In one possible embodiment, the Group 15 atom and metal containing compounds may include a bisamide compound such as $[(2,3,4,5,6\ Me_5C_6)NCH_2CH_2]_2$ $NHZrBz_2$ also known as Bis(phenylmethyl)[N'-(2,3,4,5,6-pentamethylphenyl)-N-[2-[(2,3,4,5,6-pentamethylphenyl)amino-kN]ethyl]-1,2-ethanediaminato(2-)kN,kN'] zirconium (from Boulder Chemical).

Chromium Catalysts

Suitable chromium catalysts include di-substituted chromates, such as $CrO_2(OR)_2$; where R is triphenylsilane or a tertiary polyalicyclic alkyl. The chromium catalyst system can further include $CrO_3$, chromocene, silyl chromate, chromyl chloride ($CrO_2Cl_2$), chromium-2-ethyl-hexanoate, chromium acetylacetonate ($Cr(AcAc)_3$), and the like. Illustrative chromium catalysts are further described in U.S. Pat. Nos. 3,709,853; 3,709,954; 3,231,550; 3,242,099; and 4,077,904.

Mixed Catalysts

It is also within the scope of this invention that one type of catalyst compound described above can be combined with one or more types of catalyst compounds described herein with one or more activators or activation methods described below.

It is further contemplated by the invention that other catalysts can be combined with the metallocene catalyst compounds of the invention. For example, see U.S. Pat. Nos. 4,937,299, 4,935,474, 5,281,679, 5,359,015, 5,470,811, and 5,719,241.

In another embodiment of the invention one or more metallocene catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090.

Activators and Activation Methods for Catalyst Compounds

An activator is defined as any combination of reagents that increases the rate at which a transition metal compound oligomerizes or polymerizes unsaturated monomers, such as olefins. An activator may also affect the molecular weight, degree of branching, comonomer content, or other properties of the oligomer or polymer. The transition metal compounds according to the invention may be activated for oligomerization and/or polymerization catalysis in any manner sufficient to allow coordination or cationic oligomerization and or polymerization.

Generally, catalysts may contain a formal anionic ligand, such as hydride or hydrocarbyl, with an adjacent (cis) coordination site accessible to an unsaturated monomer. Coordination of an unsaturated monomer to the cis coordination site allows a migratory insertion reaction to form a metal alkyl. Repetition of this process causes the chain growth associated with oligomerization and/or polymerization. An activator is thus any combination of reagents that facilitates formation of a transition metal compound containing cis coordinated olefin and hydride or hydrocarbyl.

When the transition metal compound contains at least one hydride or hydrocarbyl ligand, activation can be achieved by removal of formal anionic or neutral ligand(s), of higher binding affinity than the unsaturated monomer. This removal process, also called abstraction, may have a kinetic rate that is first-order or non-first order with respect to the activator. Activators that remove anonic ligands are termed ionizing activators. Alternatively, activators that remove neutral ligands are termed non-ionizing activators. Activators may be strong Lewis-acids which may play either the role of an ionizing or non-ionizing activator.

When the transition metal compound does not contain at least one hydride or hydrocarbyl ligands, then activation may be a one step or multi step process. One step in this process includes coordinating a hydride or hydrocarbyl group to the metal compound. A separate activation step is removal of anionic or neutral ligands of higher binding affinity than the unsaturated monomer. These activation steps may occur in the presence of an olefin and occur either in series or in parallel. More than one sequence of activation steps is possible to achieve activation.

The activator may also act to coordinate a hydride or hydrocarbyl group to the transition metal compound. When the transition metal compound does not contain at least one hydride or hydrocarbyl ligands but rather contains at least one functional group ligand, activation may be effected by substitution of the functional group with a hydride, hydrocarbyl or substituted hydrocarbyl group. This substitution may be effected with appropriate hydride or alkyl reagents of group 1, 2, 12, 13 elements as are known in the art. To achieve activation, it may be necessary to also remove anionic or neutral ligands of higher binding affinity than the unsaturated monomer.

Alumoxane and aluminum alkyl activators are capable of alkylation and abstraction activation.

The activator may also act to coordinate a hydride or hydrocarbyl group to the transition metal compound. If the transition metal compound does not contain anionic ligands, then a hydride, hydrocarbyl or substituted hydrocarbyl may be coordinated to a metal using electrophilic proton or alkyl transfer reagents represented by $H^+(LB)_nA^-$, $(R^9)^+(LB)_nA^-$. $R^9$ may be a hydrocarbyl or a substituted hydrocarbyl; LB is a Lewis-base, and wherein n=0, 1 or 2. Non-limiting examples of preferred Lewis-bases are diethyl ether, dimethyl ether, ethanol, methanol, water, acetonitrile, N,N-dimethylaniline. $A^-$ is an anion, preferably a substituted hydrocarbon, a functional group, or a non-coordinating anion. Non-limiting examples of $A^-$ may include halides, carboxylates, phosphates, sulfates, sulfonates, borates, aluminates, alkoxides, thioalkoxides, anionic substituted hydrocarbons, anionic metal complexes and the like.

Other activators include those described in WO 98/07515 such as tris (2,2',2"-nonafluorobiphenyl) fluoroaluminate. Combinations of activators are also contemplated by the invention, for example, alumoxanes and ionizing activators in combinations, see for example, EP-B1 0 573 120, WO 94/07928 and WO 95/14044 and U.S. Pat. Nos. 5,153,157 and 5,453,410. WO 98/09996 describes activating metallocene catalyst compounds with perchlorates, periodates and iodates including their hydrates. WO 98/30602 and WO 98/30603 describe the use of lithium (2,2'-bisphenyl-ditrimethylsilicate).4THF as an activator for a metallocene catalyst compound. WO 99/18135 describes the use of organo-boron-aluminum activators. EP-B1-0 781 299 describes using a silylium salt in combination with a non-coordinating compatible anion. WO 2007/024773 suggests the use of activator-supports which may comprise a chemically-treated solid oxide, clay mineral, silicate mineral, or any combination thereof. Also, methods of activation such as using radiation (see EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in, for example, U.S. Pat. Nos. 5,849,852, 5,859,653 and 5,869,723 and PCT WO 98/32775.

A. Aluminoxane and Aluminum Alkyl Activators

In one embodiment, alumoxanes activators may be utilized as an activator in the catalyst composition of the invention. Alumoxane(s) or aluminoxane(s) are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in, for example, U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, WO 94/10180 and WO 99/15534. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, disclosed in U.S. Pat. No. 5,041,584).

Aluminum alkyl or organoaluminum compounds which may be utilized as activators (or scavengers) include trimethylaluminum, triethylaluminum, triisobutylaluminum, tri-n-hexylaluminum, tri-n-octylaluminum and the like.

B. Ionizing Activators

It is within the scope of this invention to use an ionizing or stoichiometric activator, neutral or ionic, such as tri (n-butyl)

ammonium tetrakis (pentafluorophenyl) boron, a trisperfluorophenyl boron metalloid precursor or a trisperfluoronaphtyl boron metalloid precursor, polyhalogenated heteroborane anions (see, for example, WO 98/43983), boric acid (see, for example, U.S. Pat. No. 5,942,459) or a combination thereof. It is also within the scope of this invention to use neutral or ionic activators alone or in combination with alumoxane or modified alumoxane activators.

Examples of neutral stoichiometric activators may include tri-substituted boron, tellurium, aluminum, gallium and indium or mixtures thereof. The three substituent groups may be each independently selected from the group of alkyls, alkenyls, halogen, substituted alkyls, aryls, arylhalides, alkoxy and halides. Preferably, the three substituent groups may be independently selected from the group of halogen, mono or multicyclic (including halosubstituted) aryls, alkyls, and alkenyl compounds and mixtures thereof; in a class of embodiments are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternatively, the three groups are alkyls having 1 to 4 carbon groups, phenyl, napthyl or mixtures thereof. In other embodiments, the three groups are halogenated, preferably fluorinated, aryl groups. In yet other illustrative embodiments, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in, for example, European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994.

By way of example, activators may include a cation and an anion component, and may be represented by the following formula:

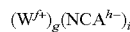

$W^{f+}$ is a cation component having the charge f+; $NCA^{h-}$ is a non-coordinating anion having the charge h−; f is an integer from 1 to 3; h is an integer from 1 to 3; g and h are constrained by the relationship: $(g) \times (f) = (h) \times (i)$. The cation component, ($W^{f+}$) may include Bronsted acids such as protons or protonated Lewis bases or reducible Lewis acids capable of protonating or abstracting a moiety, such as an alkyl or aryl, from an analogous metallocene or Group 15-containing catalyst precursor, resulting in a cationic transition metal species.

In an illustrative embodiment, the activators include a cation and an anion component, and may be represented by the following formula: $(LB-H^{f+})_g(NCA^{h-})_i$ wherein LB is a neutral Lewis base; H is hydrogen; $NCA^{h-}$ is a non-coordinating anion having the charge h−; f is an integer from 1 to 3; h is an integer from 1 to 3; g and h are constrained by the relationship: $(g) \times (f) = (h) \times (i)$.

The activating cation ($W^{f+}$) may be a Bronsted acid, (LB-$H^{f+}$), capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers and tetrahydrothiophene and mixtures thereof.

The activating cation ($W^{f+}$) may also be an abstracting moiety such as silver, carboniums, tropylium, carbeniums, ferroceniums and mixtures, preferably carboniums and ferroceniums. Most preferably ($W^{f+}$) is triphenyl carbonium or N, N-dimethylanilinium.

The anion component ($NCA^{h-}$) may include those having the formula $[T^{j+}Q_k]^{h-}$ wherein j is an integer from 1 to 3; k is an integer from 2 to 6; k−j=h; T is an element selected from Group 13 or 15 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, wherein Q may have up to 20 carbon atoms with the condition that in not more than 1 occurrence is Q a halide. Preferably, each Q is a fluorinated hydrocarbyl group having 1 to 20 carbon atoms, alternatively each Q may be a fluorinated aryl group, and in another embodiment, each Q is a pentafluoryl aryl group. Examples of suitable ($NCA^{h-}$) also include diboron compounds as disclosed in U.S. Pat. No. 5,447,895.

Additional suitable anions are known in the art and will be suitable for use with the catalysts of the invention. See for example, U.S. Pat. No. 5,278,119 and the review articles by S. H. Strauss, "The Search for Larger and More Weakly Coordinating Anions", Chem. Rev., 93, 927 942 (1993) and C. A. Reed, "Carboranes: A New Class of Weakly Coordinating Anions for Strong Electrophiles, Oxidants and Superacids", Acc. Chem. Res., 31, 133 139 (1998).

Illustrative, but not limiting examples of boron compounds which may be used as activating cocatalysts in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis (pentafluorophenyl)borate, triethylammonium tetrakis (pentafluorophenyl)borate, tripropylammonium tetrakis (pentafluorophenyl)borate, tri(n-butyl)ammonium tetrakis (pentafluorophenyl)borate, tri(sec-butyl)ammonium tetrakis (pentafluorophenyl)borate, N,N-dimethylanilinium tetrakis (pentafluorophenyl)borate, N,N-diethylanilinium tetrakis (pentafluorophenyl)borate, N,N-dimethyl-(2,4,6-trimethylanilinium) tetrakis(pentafluorophenyl)borate, trimethylammonium tetrakis-(2,3,4,6-tetrafluorophenylborate, triethylammonium tetrakis-(2,3,4,6-tetrafluorophenyl) borate, tripropylammonium tetrakis-(2,3,4,6-tetrafluorophenyl)borate, tri(n-butyl)ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluoro-phenyl)borate, and N,N-dimethyl-(2,4,6-trimethylanilinium)tetrakis-(2,3,4, 6-tetrafluoropheny-1) borate; dialkyl ammonium salts such as: di-(i-propyl)ammonium tetrakis(pentafluorophenyl) borate, and dicyclohexylammonium tetrakis(pentafluorophenyl)borate; and tri-substituted phosphonium salts such as: triphenylphosphonium tetrakis(pentafluorophenyl)borate, tri (o-tolyl)phosphonium tetrakis(pentafluorophenyl)borate, and tri(2,6-dimethylphenyl)phosphonium tetrakis(pentafluorophenyl)borate.

In one possible embodiment, the ionic stoichiometric activator is N,N-dimethylanilinium tetra(perfluorophenyl)borate or triphenylcarbenium tetra(perfluorophenyl)borate.

An activation method using ionizing ionic compounds not containing an active proton but capable of producing a metallocene catalyst cation and its non-coordinating anion are also contemplated, and are described in, for example, EP-A-0 426 637, EP-A-0 573 403 and U.S. Pat. No. 5,387,568.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Non-coordinating anions useful in accordance with this invention are those that are compatible, stabilize the metal cation in balancing its ionic charge, yet retain sufficient liability to permit displacement by an ethylenically or acetylenically unsaturated monomer during polymerization. These types of cocatalysts may use tri-isobutyl aluminum or tri-octyl aluminum as a scavenger.

Processes of the current invention also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878, 5,486,632, and 5,527,929.

Additional neutral Lewis-acids are known in the art and are suitable for abstracting anionic ligands. See, for example, the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391 1434 (2000).

When the transition metal compound does not contain at least one hydride or hydrocarbyl ligand but does contain at least one functional group ligand, such as chloride, amido or alkoxy ligands, and the functional group ligand(s) are not capable of discrete ionizing abstraction with the ionizing, anion pre-cursor compounds, these functional group ligands can be converted via known alkylation reactions with organometallic compounds such as lithium or aluminum hydrides or alkyls, alkylalumoxanes, Grignard reagents and the like. See, for example, EP-A-0 500 944, EP-A1-0 570 982 and EP-A1-0 612 768 for analogous processes describing the reaction of alkyl aluminum compounds with analogous dihalide substituted metallocene compounds prior to or with the addition of activating noncoordinating anion precursor compounds.

C. Non-Ionizing Activators

Activators are typically strong Lewis-acids which may play either the role of ionizing or non-ionizing activator. Activators previously described as ionizing activators may also be used as non-ionizing activators.

Abstraction of formal neutral ligands may be achieved with Lewis acids that display an affinity for the formal neutral ligands. These Lewis acids are typically unsaturated or weakly coordinated. Examples of non-ionizing activators may include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene. Non-ionizing activators may also include weakly coordinated transition metal compounds such as low valence olefin complexes. Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$, alumoxane, CuCl, $Ni(1,5\text{-cyclooctadiene})_2$.

Additional neutral Lewis-acids are known in the art and will be suitable for abstracting neutral ligands. See, for example, the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391 1434 (2000).

Illustrative non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene.

Alternative non-ionizing activators include $B(R^{12})_3$, where $R^{12}$ is an arene or a perfluorinated arene. Even more non-ionizing activators include $B(C_6H_5)_3$ and $B(C_6F_5)_3$. A particularly preferred non-ionizing activator is $B(C_6F_5)_3$. More preferred activators are ionizing and non-ionizing activators based on perfluoroaryl borane and perfluoroaryl borates such as $PhNMe_2H^+B(C_6F_5)_4^-$, $(C_6H_5)_3C^+B(C_6F_5)_4^-$, and $B(C_6F_5)_3$.

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation. For example, tris(perfluorophenyl)boron can be used with methylalumoxane.

In general, the precursor compounds and the activator are combined in ratios of about 1000:1 to about 0.5:1. In an embodiment the precursor compounds and the activator are combined in a ratio of about 300:1 to about 1:1, alternatively about 150:1 to about 1:1, for boranes, borates, aluminates, etc. the ratio is about 1:1 to about 10:1 and for alkyl aluminum compounds (such as diethylaluminum chloride combined with water) the ratio is about 0.5:1 to about 10:1.

At times two or more catalyst precursor compounds may be present. In some embodiments, the ratio of the first catalyst precursor compound to the second or additional catalyst precursor compounds is 5:95 to 95:5, alternatively 25:75 to 75:25, in other embodiment 40:60 to 60:40.

The catalyst compositions of this invention may include a support material or carrier. For example, the one or more catalyst components and/or one or more activators may be deposited on, contacted with, vaporized with, bonded to, or incorporated within, adsorbed or absorbed in, or on, one or more supports or carriers.

The support material is any of the conventional support materials. The supported material may be a porous support material, for example, talc, inorganic oxides and inorganic chlorides. Other support materials may include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Illustrative support materials such as inorganic oxides include Group 2, 3, 4, 5, 13 or 14 metal oxides. The preferred supports include silica, which may or may not be dehydrated, fumed silica, alumina (see, for example, WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as disclosed in WO 99/47598, aerogels as disclosed in WO 99/48605, spherulites as disclosed in U.S. Pat. No. 5,972,510 and polymeric beads as disclosed in WO 99/50311.

The support material, such as an inorganic oxide, may have a surface area in the range of from about 10 to about 700 m$^2$/g, pore volume in the range of from about 0.1 to about 4.0 cc/g and average particle size in the range of from about 5 to about 500 μm. More preferably, the surface area of the support material is in the range of from about 50 to about 500 m$^2$/g, pore volume of from about 0.5 to about 3.5 cc/g and average particle size of from about 10 to about 200 μm. Most preferably the surface area of the support material is in the range is from about 100 to about 400 m$^2$/g, pore volume from about 0.8 to about 3.0 cc/g and average particle size is from about 5 to about 100 μm. The average pore size of the carrier of the invention typically has pore size in the range of from 10 to 1000 Å, alternatively 50 to about 500 Å, and in some embodiment 75 to about 350 Å.

Method for Supporting

The above described metallocene catalyst compounds and catalyst systems as well as conventional-type transition metal catalyst compounds and catalyst systems may be combined with one or more support materials or carriers using one of the support methods well known in the art or as described below. In one possible embodiment, the method of the invention uses a catalyst, such as a metallocene or a conventional-type transition metal catalyst, in a supported form. For example, in another embodiment, a metallocene catalyst compound or catalyst system is in a supported form, for example, deposited on, contacted with, or incorporated within, adsorbed or absorbed in, or on, a support or carrier.

The terms "support" or "carrier" are used interchangeably and are any support material, including a porous support material, for example, talc, inorganic oxides, and inorganic chlorides. Other carriers include resinous support materials such as polystyrene, functionalized or crosslinked organic supports, such as polystyrene divinyl benzene polyolefins or other polymeric compounds, or any other organic or inorganic support material and the like, or mixtures thereof.

Inorganic oxides may include Group 2, 3, 4, 5, 13 or 14 metal oxides. The supports may include, but are not limited to, silica, alumina, silica-alumina, magnesium chloride, and mixtures thereof. Other useful supports may include magnesia, titania, zirconia, montmorillonite (see for example, EP-B1 0 511 665) and other clays and nanoclays, graphite, zeolites and the like. Also, combinations of these support materials may be used, for example, silica-chromium, silica-alumina, silica-titania and the like.

In one embodiment, the carrier, such as an inorganic oxide, may have a surface area in the range of from about 10 to about 700 m$^2$/g, pore volume in the range of from about 0.1 to about 4.0 cc/g and average particle size in the range of from about 1 to about 500 μm. Alternatively, the surface area of the carrier may be in the range of from about 50 to about 500 m$^2$/g, pore volume of from about 0.5 to about 3.5 cc/g and average particle size of from about 10 to about 200 μm. In another embodiment, the surface area of the carrier is in the range is from about 100 to about 400 m$^2$/g, pore volume from about 0.8 to about 3.0 cc/g and average particle size is from about 5 to about 100 μm. In yet another illustrative embodiment, the average pore size of the carrier is from about 1 to about 50 μm. The average pore size of the carrier of the invention typically has pore size in the range of from 10 to 1000 Å preferably 50 to about 500 Å and most preferably 75 to about 350 Å.

In one embodiment, the metallocene catalyst compounds of the invention may be supported on the same or separate supports together with an activator, or the activator may be used in an unsupported form, or may be deposited on a support different from the supported metallocene catalyst compounds of the invention, or any combination thereof. This may be accomplished by any technique commonly used in the art.

There are various other methods in the art for supporting a polymerization catalyst compound or catalyst system of the invention. For example, the metallocene catalyst compound of the invention may contain a polymer bound ligand as described in, for example, U.S. Pat. Nos. 5,473,202 and 5,770,755; the metallocene catalyst system of the invention may be spray dried as described in, for example, U.S. Pat. No. 5,648,310; the support used with the metallocene catalyst system of the invention may be functionalized as described in European publication EP-A-0 802 203, or at least one substituent or leaving group is selected as described in U.S. Pat. No. 5,688,880.

In one embodiment, the invention provides for a supported metallocene catalyst system that may limit the use of any antistatic agents or surface modifiers that are typically used in the preparation of the supported catalyst systems. As used herein, "surface modifiers" may include compounds such as, but not limited to, ethoxylated amines (e.g., IRGASTAT AS-990 from Ciba), mercaptans (e.g., octylmercaptan), surfactants, sulfonates, Group 1 or 2 cations, and other organic and inorganic additives that are added to the catalyst composition (metallocene, activator and support material) or directly to the reactor to improve reactor performance by, for example, reducing fouling or sheeting of polymer on the inner surfaces of the reactor, or by reducing the formation of large chunks (greater than 1 or 2 cm diameter/length) of polymer from forming. The surface modifier excludes activator compounds, and in fact, surface modifiers may inhibit catalyst activity.

One method for producing the supported metallocene catalyst system of the invention is described as follows: the metallocene catalyst compound is slurried in a liquid to form a metallocene solution and a separate solution is formed containing an activator and a liquid. The liquid may be any compatible solvent or other liquid capable of forming a solution or the like with the metallocene catalyst compounds and/or activator of the invention. In one embodiment the liquid is a cyclic aliphatic or aromatic hydrocarbon. The metallocene catalyst compound and activator solutions are mixed together and added to a porous support or the porous support is added to the solutions such that the total volume of the metallocene catalyst compound solution and the activator solution or the metallocene catalyst compound and activator solution is less than four times the pore volume of the porous support, more preferably less than three times, even more preferably less than two times; ranges being from 1.1 times to 3.5 times range and most preferably in the 1.2 to 3 times range. The supported metallocene catalyst system may be formed by other suitable methods known in the art.

In a class of embodiments of the invention, olefin(s) or alpha-olefin(s), such as ethylene, propylene or combinations thereof, including other comonomers, are prepolymerized in the presence of the catalyst system of the invention prior to the main polymerization. The prepolymerization can be carried out batchwise or continuously in gas, solution, or slurry phase including at elevated pressures. The prepolymerization can take place with any olefin monomer or combination and/or in the presence of any molecular weight controlling agent. For examples of prepolymerization procedures, see U.S. Pat. Nos. 4,748,221, 4,789,359, 4,923,833, 4,921,825, 5,283,278 and 5,705,578, EP-B-0279 863 and WO 97/44371. A prepolymerized catalyst system for purposes of this patent specification and appended claim is a supported catalyst system, in accord with a class of embodiments.

INDUSTRIAL APPLICABILITY

The bimodal composition can be used in a wide variety of products and end-use applications. The bimodal composition may be blended and/or coextruded with any other polymer. Non-limiting examples of other polymers include linear low density polyethylenes, elastomers, plastomers, high pressure low density polyethylene, high density polyethylenes, polypropylenes and the like.

The bimodal composition and blends thereof may be useful in forming operations such as film, sheet, and fiber extrusion and co-extrusion as well as blow molding, injection molding and rotary molding. Films can include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers can include melt spinning, solution spinning and melt blown fiber operations for use in woven or non-woven form to make filters, diaper fabrics, medical garments, geotextiles, etc. Extruded articles can include medical tubing, wire and cable coatings, pipe, geomembranes, and pond liners. Molded articles may include single and multi-layered constructions in the form of bottles, tanks, large hollow articles, rigid food containers and toys, etc.

EXAMPLES

Example 1

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

Sample catalyst composition No. 1 was prepared by mixing 13.7 g (0.035 mol) of (n-Propylcyclopentadienyl) (tetramethylcyclopentadienyl) Zirconium dichloride supplied by Boulder Scientific Company and 70.4 g (0.106 mol) of [(2,3,4,5,6-Me$_5$C$_6$)NCH$_2$CH$_2$]$_2$NHZrBz$_2$ or Bis(phenylmethyl)[N'-(2,3,4,5,6-pentamethylphenyl)-N-[2-[(2,3,4,5,6-pentamethylphenyl)amino-kN]ethyl]-1,2-ethanediaminato(2-)kN,kN']zirconium, supplied by Boulder Scientific Company with 11.6 kilograms (19.7 mol) of methylalumoxane (MAO) of a 10% solution by weight of MAO in toluene, 16.8 kilograms of toluene, and with 1.6 kilograms of treated fumed silica (Cabosil TS-610). The (n-Propylcyclopentadienyl) (tetramethylcyclopentadienyl) Zirconium dichloride, [(2,3,4,5,6-Me$_5$C$_6$)NCH$_2$CH$_2$]$_2$NHZrBz$_2$, MAO in toluene solution, and treated fumed silica were introduced into an atomizing device, thereby producing droplets that were contacted with a gas stream to evaporate the liquid, thereby forming a powder. The actual yield was about 2.8 kilograms. The resulting powder was then mixed with hydrobrite 380 PO white mineral oil purchased from Sonneborn, and hexane to obtain a catalyst slurry that contained 22 wt % solid catalyst. Prior to mixing, hydrobrite 380 oil was purified by degassing with nitrogen for about 1 hour, followed by heating at 80° C., under vacuum for 10 hours). The mole ratio of [(2,3,4,5,6-Me$_5$C$_6$)NCH$_2$CH$_2$]$_2$NHZrBz$_2$ to (n-Propylcyclopentadienyl) (tetramethylcyclopentadienyl) Zirconium dichloride of final catalyst composition was 3.0 to 1.0.

Sample catalyst composition No. 2 was prepared by mixing 19.0 g (0.047 mol) of Bis(n-butylcyclopentadienyl) Zirconium dichloride, supplied by Boulder Scientific Company and 62.6 grams (0.094 mol) of [(2,3,4,5,6-Me$_5$C$_6$)NCH$_2$CH$_2$]$_2$NHZrBz$_2$ with 11.6 kilograms (19.7 mol of MAO) of a 10% solution by weight of MAO in toluene, 16.8 kilograms of toluene, and with 1.6 kilograms of treated fumed silica (Cabosil TS-610). The Bis(n-butylcyclopentadienyl) Zirconium dichloride, [(2,3,4,5,6-Me$_5$C$_6$)NCH$_2$CH$_2$]$_2$NHZrBz$_2$, MAO in toluene solution, and treated fumed silica were introduced into an atomizing device, thereby producing droplets that were contacted with a gas stream to evaporate the liquid, thereby forming a powder. The actual yield was about 2.8 kilograms. The resulting powder was then mixed with hydrobite 380 PO white mineral oil purchased from Sonneborn and hexane to obtain a catalyst slurry that contained 22 wt % solid catalyst. The mole ratio of [(2,3,4,5,6-Me$_5$C$_6$)NCH$_2$CH$_2$]$_2$NHZrBz$_2$ to Bis(n-butylcyclopentadienyl) Zirconium dichloride of final catalyst composition was 2.0 to 1.0.

Samples 1-5 were produced continuously in the fluidized-bed reactor. Cycled gas was circulated through the reactor and the heat of reaction was removed in a heat exchanger. Catalyst slurry was continuously introduced into the fluidized bed. Monomer and hydrogen were fed into the cycle gas piping. Reaction products were transferred intermittently into a product chamber, depressurized, degassed, then discharged into a drum. Some key reactor parameters for Samples 1-5 are listed in Table 1 below, together with the corresponding polymer properties.

As shown in Table 1, Samples 1-5 exhibited higher MFR, Mw, Mz, Mz+1 and Mz/Mn than that of the comparative examples C1 and C2. In addition, Samples 1-5 possessed melt index (I$_2$) less than 0.3. As results of these unique combinations, Samples 1-5 exhibited higher ESCR and Top Load than that of comparative C1 and C2.

Example 2

Prior to blow molding, the granular resin was formulated with 0.2% IRGANOX™ B-225 (available from Ciba Specialty Chemicals, Terrytown, N.Y.). Compounding of the resins was carried out on a Werner & Pfleiderer ZSK 40 mm twin screw extruder under a nitrogen blanket. Output rate was 68.1 kg/h (150 Ib/h) and the melt temperature was kept below about 215° C. Bottles produced from the polyethylene compositions were blow molded using a Bekum single shuttle blow molding machine model BAE1/S631. The polyethylene was extruded through a converging die and blow molded to form a one quart Boston round bottle weighing 41.0+/−0.5 grams with a wall thickness between about 0.01 inches and about 0.02 inches. 10 bottles were filled to about 1 quart capacity with 23° C. water, capped and conditioned at 23° C. for 24 hours. Bottles were then tested in a compression testing machine described in ASTM D-2659 at a speed of about 2.0 inches per minute. The top load strength was reported as the yield load in lbs.

may yield different results or measurements. Thus, a person of ordinary skill in the art is to expect experimental variations in measured properties that are reflected in the claims. All numerical values can be considered to be "about" or "approximately" the stated value, in view of the nature of testing in general.

The phrases, unless otherwise specified, "consists essentially of" and "consisting essentially of" do not exclude the

TABLE 1

| Example | 1 | 2 | 3 | 4 | 5 | Comparative C-1 | Comparative C-2 |
|---|---|---|---|---|---|---|---|
| Sample Catalyst Composition | 1 | 2 | 1 | 1 | 1 | | |
| Reactor Temperature ° C. | 105 | 105 | 100 | 100 | 100 | | |
| C2 partial pressure (psi) | 220 | 220 | 220 | 220 | 220 | | |
| H2/C2 mole ratio | 0.001 | 0.00076 | 0.001 | 0.001 | 0.001 | | |
| C6/C2 mole ratio | 0.0008 | 0.0007 | 0.0014 | 0.0014 | 0.0014 | | |
| Residence time (hr) | 2.5 | 2.7 | 2.95 | 2.4 | 2.5 | | |
| Catalyst productivity (lb/lb) | 8814 | 9616 | 10826 | 13180 | 9834 | | |
| Resin bulk density (lb/ft3) | 30.2 | 29.1 | 27.8 | 28.5 | 26.4 | | |
| Resin average particle size (in) | 0.037 | 0.048 | 0.05 | 0.05 | 0.037 | | |
| Resin fines (wt %) | 1.88 | 0.21 | 0.55 | 0.61 | 0.68 | | |
| Mn | 17,564 | 23,205 | 10,003 | 14,483 | 14,049 | 12,942 | 11,615 |
| Mw >200,000 | 252,419 | 336,178 | 223,491 | 241,027 | 269,893 | 168,725 | 127,064 |
| Mz >1,500,000 | 1,734,738 | 2,495,208 | 1,582,013 | 1,639,889 | 1,972,476 | 872,539 | 642,259 |
| Mz + 1 >3,000,000 | 3,185,153 | 4,665,453 | 2,958,243 | 3,007,977 | 3,811,028 | 1,636,028 | 1,419,103 |
| Mw/Mn | 14.4 | 14.5 | 22.3 | 16.6 | 19.2 | 13.0 | 10.9 |
| Mz/Mw >6.0 | 6.9 | 7.4 | 7.1 | 6.8 | 7.3 | 5.2 | 5.1 |
| $I_2$ <0.3 | 0.15 | 0.12 | 0.14 | 0.16 | 0.20 | 0.46 | 0.38 |
| $I_{21}$ 20-45 | 33.1 | 20 | 25 | 30 | 35 | 38.5 | 32.6 |
| MFR ($I_{21}/I_2$) >100 | 214 | 171 | 186 | 186 | 174 | 84 | 86 |
| Density >0.940 g/cc | 0.9600 | 0.9570 | 0.9565 | 0.9565 | 0.9573 | 0.9567 | 0.9531 |
| Bottle Top Load, lbs | 174 | 152 | 159 | 176 | 156 | 146 | 101 |
| ESCR, 10% F50 hrs | 175 | 158 | 222 | 249 | 226 | 141 | 48 |

For purposes of convenience, various specific test procedures have been identified for determining properties such as average molecular weight, molecular weight distribution (MWD), flow index (FI), melt index (MI), melt flow ratio (MFR), and density. However, when a person of ordinary skill reads this patent and wishes to determine whether a composition or polymer has a particular property identified in a claim, then any published or well-recognized method or test procedure can be followed to determine that property (although the specifically identified procedure is preferred, and that any procedure specified in a claim is mandatory, not merely preferred).

Each claim should be construed to cover the results of any of such procedures, even to the extent different procedures presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A bimodal polyethylene composition comprising ethylene-derived units, and optionally, one or more other olefin-derived units, wherein the bimodal polyethylene composition possesses a density of at least 0.940 g/cc, an average molecular weight (Mw) of from 200,000 to 370,000, a z-average molecular weight (Mz) of from 1,500,000 to 3,400,000 Daltons, and a z+1 average molecular weight (Mz+1) of from 2,500,000 to 6,800,000 Daltons.

2. The bimodal polyethylene composition of claim 1 further possessing an MFR ($I_{21}/I_2$) of greater than 100.

3. The bimodal polyethylene composition of claim 1 further possessing a flow index (FI) of from 20 to 45 g/10 min.

4. The bimodal polyethylene composition of claim 1 further possessing a melt index (MI) of from 0.10 g/10 min to 0.30 g/10 min.

5. The bimodal polyethylene composition of claim 1 further possessing a z-average molecular weight (Mz) to average molecule weight (Mw) ratio (Mz/Mw) of from 6.6 to 9.2.

6. The bimodal polyethylene composition of claim 1, wherein the density is from 0.9560 g/cc to 0.9607 g/cc.

7. The bimodal polyethylene composition of claim 1 further possessing an ESCR of greater than 150 hours.

8. The bimodal polyethylene composition of claim 1, wherein the bimodal polyethylene composition is formed by contacting the ethylene, and optionally, one or more other olefins, with a catalyst.

9. The bimodal polyethylene composition of claim 8, wherein the catalyst is selected from the group consisting of conventional-type transition metal catalysts, metallocene catalysts, chromium catalysts, group 15 atom and metal containing catalyst, and a combination thereof.

10. A method of producing a bimodal polyethylene composition in a single reactor, the method comprising:
    contacting ethylene, hydrogen, and, optionally, one or more other olefin, with a catalyst, the catalyst selected from the group consisting of conventional-type transition metal catalysts, metallocene catalysts, chromium catalysts, group 15 atom and metal containing catalysts, and a combination thereof;
    wherein the bimodal polyethylene composition comprises ethylene-derived units, and optionally, one or more other olefin-derived units and possesses a density of at least 0.940 g/cc, an average molecular weight (Mw) of from 200,000 to 370,000, a z-average molecular weight (Mz) of from 1,500,000 to 3,400,000 Daltons, and a z+1 average molecular weight (Mz+1) of from 2,500,000 to 6,800,000 Daltons.

11. The method of claim 10, wherein the metallocene is selected from the group consisting of:
    (n-Propylcyclopentadienyl)(tetramethylcyclopentadienyl)zirconium $X_n$, (n-Propylcyclopentadienyl) (tetramethylcyclopentadienyl)hafnium $X_n$, (n-Propylcyclopentadienyl)(pentamethylcyclopentadienyl)zirconium $X_n$, (n-Propylcyclopentadienyl)(pentamethylcyclopentadienyl)hafnium $X_n$, bis(n-butylcyclopentadienyl)zirconium $X_n$, bis(n-butylcyclopentadienyl)hafnium $X_n$
wherein X is selected from the group consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons and substituted derivatives thereof, n is an integer from 1 to 6.

12. The method of claim 10, wherein the metallocene is selected from the group consisting of:
    (n-Propylcyclopentadienyl) (tetramethylcyclopentadienyl)zirconium $X_n$, (n-Propylcyclopentadienyl) (pentamethylcyclopentadienyl)zirconium $X_n$, bis(n-butylcyclopentadienyl)zirconium $X_n$
wherein X is selected from the group consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons and substituted derivatives thereof n is an integer from 1 to 6.

13. The method of claim 10, wherein the metallocene is selected from the group consisting of:
    (n-Propylcyclopentadienyl)(tetramethylcyclopentadienyl)zirconium $X_n$, (n-Propylcyclopentadienyl) (pentamethylcyclopentadienyl)zirconium $X_n$, bis(n-butylcyclopentadienyl)zirconium $X_n$
wherein X is a halogen ion and n is 2.

14. The method of claim 10, wherein the metallocene is selected from the group consisting of:
    (n-Propylcyclopentadienyl)(tetramethylcyclopentadienyl)zirconium $X_n$, (n-Propylcyclopentadienyl) (pentamethylcyclopentadienyl)zirconium $X_n$, bis(n-butylcyclopentadienyl)zirconium $X_n$
wherein X is a chloride ion and n is 2.

15. The method of claim 14, using a ratio of hydrogen to ethylene of from 0.0005:1 to 0.002:1.

16. The method of claim 15, using a ratio of alpha olefin to ethylene of from 0.0005:1 to 0.003:1.

17. The method of claim 10, wherein the bimodal polyethylene composition further possesses an MFR ($I_{21}/I_2$) of great than 100.

18. The method of claim 10, wherein the bimodal polyethylene composition further possesses a flow index (FI) of from 20 to 45 g/10 min.

19. The method of claim 10, wherein the bimodal polyethylene composition further possesses a melt index (MI) of from 0.10 g/10 min to 0.30 g/10 min.

20. The method of claim 10, wherein the bimodal polyethylene composition further possesses a z-average molecular weight (Mz) to average molecule weight (Mw) ratio (Mz/Mw) of from 6.6 to 9.2.

21. The method of claim 10, wherein the density of the bimodal polyethylene composition is from 0.9560 g/cc to 0.9607 g/cc.

22. The method of claim 10, wherein the bimodal polyethylene composition further possesses an ESCR of greater than 150 hours.

23. A blow molded article made from a bimodal polyethylene composition comprising ethylene-derived units, and, optionally, one or more other olefin-derived units, wherein the bimodal polyethylene composition possesses a density of at least 0.940 g/cc, an average molecular weight (Mw) of from 200,000 to 370,000, a z-average molecular weight (Mz) of from 1,500,000 to 3,400,000 Daltons, and a z+1 average molecular weight (Mz+1) of from 2,500,000 to 6,800,000 Daltons.

24. The article of claim 23, wherein the bimodal polyethylene composition further possesses an MFR ($I_{21}/I_2$) of greater than 100.

25. The article of claim 23, wherein the bimodal polyethylene composition further possesses a flow index (FI) of from 20 to 45 g/10 min.

26. The article of claim 23, wherein the bimodal polyethylene composition further possesses a melt index (MI) of from 0.10 g/10 min to 0.30 g/10 min.

27. The article of claim 23, wherein the bimodal polyethylene composition further possesses a z-average molecular weight (Mz) to average molecule weight (Mw) ratio (Mz/Mw) of from 6.6 to 9.2.

28. The article of claim 23, wherein the density of the bimodal polyethylene composition is from 0.9560 g/cc to 0.9607 g/cc.

29. The article of claim 23, wherein the bimodal polyethylene composition further possesses an ESCR of greater than 150 hours.

30. The article of claim 23, wherein the bimodal polyethylene composition is formed by contacting ethylene, and, optionally, one or more other olefins, with a catalyst, the catalyst is selected from the group consisting of conventional-type transition metal catalysts, metallocene catalysts, chromium catalysts, group 15 atom and metal containing catalyst, and a combination thereof.

* * * * *